United States Patent
Ogino et al.

(10) Patent No.: US 6,430,291 B1
(45) Date of Patent: Aug. 6, 2002

(54) METHOD AND DEVICE FOR CONTROLLING INFORMATION SIGNAL RECORDING

(75) Inventors: Akira Ogino, Chiba; Nozomu Ikeda, Tokyo, both of (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/031,687

(22) Filed: Feb. 27, 1998

(30) Foreign Application Priority Data

Mar. 6, 1997 (JP) .............................. 9-051257

(51) Int. Cl.$^7$ .................. H04N 5/782; H04N 7/167
(52) U.S. Cl. .................. 380/203; 380/253; 360/60; 369/47; 386/94
(58) Field of Search ................ 380/203, 253; 360/60; 369/47; 386/94

(56) References Cited

U.S. PATENT DOCUMENTS

| | | | |
|---|---|---|---|
| 4,975,898 A | 12/1990 | Yoshida | 369/100 |
| 5,134,496 A * | 7/1992 | Schwab et al. | 358/335 |
| 5,177,618 A * | 1/1993 | Dunlap et al. | 358/335 |
| 5,214,626 A * | 5/1993 | Satoh et al. | 369/32 |
| 5,689,559 A * | 11/1997 | Park | 380/3 |

FOREIGN PATENT DOCUMENTS

| | | | |
|---|---|---|---|
| DE | 4433868 | 5/1995 | |
| JP | 04215153 | 8/1992 | 380/203 |

\* cited by examiner

*Primary Examiner*—Gilberto Barron
*Assistant Examiner*—Todd Jack
(74) *Attorney, Agent, or Firm*—Jay H. Maioli (57) ABSTRACT

An anti-duplication control signal detection section detects an anti-duplication control signal added on a video signal S1 and supplies it to a system controller as a duplication prevention control information S2. A write control section of the system controller stops the duplication of the video signal in a disk if the anti-duplication control information is an information which indicates duplication inhibition. In this case, the video signal recorded in the disk is erased under the control from the erasing control section by the time the duplication prevention control corresponding to the anti-duplication control signal becomes active.

16 Claims, 3 Drawing Sheets

FIG. 2

FIG. 3

METHOD AND DEVICE FOR CONTROLLING INFORMATION SIGNAL RECORDING

BACKGROUND OF THE INVENTION

1. Field of the Invention

This invention relates to a method and device for controlling duplication prevention of an information signal using, for example, an anti-duplication control signal recorded in a recording medium together with the information signal.

2. Description of Related Art

VTR (Video Tape Recorder) has been popularized and a lot of software for being played back on a VTR is available. Recently playback devices and recording/playback devices such as a digital VTR and DVD (Digital Video Disk) have been used practically, and pictures and sound of good quality can be played back and viewed easily.

However, on the other hand, the popularization gives rise to a problem that such abundant software is duplicated without any restriction, and heretofore various duplication prevention measures are available.

For example, though it is not a method for directly inhibiting duplication of analog video signals, a method has been available in which the difference in AGC (Auto Gain Control) system or APC (Auto Phase Control) characteristics between a recording device such as a VTR and a monitor receiver for displaying a picture is utilized to prevent duplication substantially.

In detail, a method in which a VTR performs AGC using a pseudo sync signal inserted in a video signal and a monitor receiver employs AGC system not using the pseudo sync signal is an example of the former method, and in the method, an extraordinarily high level pseudo sync signal is previously inserted as a sync signal for AGC when an analog video signal is recorded in an original recording medium, and then the extraordinarily high level pseudo sync signal is inserted in a video signal supplied from a playback VTR to a recording VTR as a sync signal for AGC.

A method utilizing the difference in APC characteristics in which the APC in a VTR follows a color burst signal in a video signal with a short time constant but the APC in a monitor receiver follows with a relatively long time constant is an example of the latter method, and in the method, the phase of a color burst signal of an video signal is previously inverted partially when analog video signals are recorded in an original recording medium, and then the video signal having the partially inverted color burst signal is output as a video signal supplied from a playback VTR to a recording VTR.

In the case described hereinabove, the monitor receiver which receives supply of the analog video signal from the playback VTR normally plays back a picture without receiving an adverse effect of the partial phase inversion of the color burst signal used for the pseudo sync signal and APC.

However, in the VTR which receives the analog video signal having the inserted pseudo sync signal described hereinabove supplied from the playback VTR or subjected to the phase inversion control of the color burst signal and records the analog video signal in a recording medium, the VTR cannot perform gain control or phase control based on the input signal, and record the video signal not normally. Therefore, a normal picture cannot be viewed when the recorded video signal is played back.

In the case which involves an analog video signal, the above-mentioned methods do not involve duplication inhibition directly, but involve duplication of an abnormal video signal, namely passive duplication prevention control.

On the other hand, in the case which involves a digital information such as a video signal, an anti-duplication control signal such as an anti-duplication code or a duplication generation restriction code is added on a video signal as a digital data and it is recorded in a recording medium in order to inhibit the duplication. This method is regarded as direct duplication prevention control.

Figure 1:
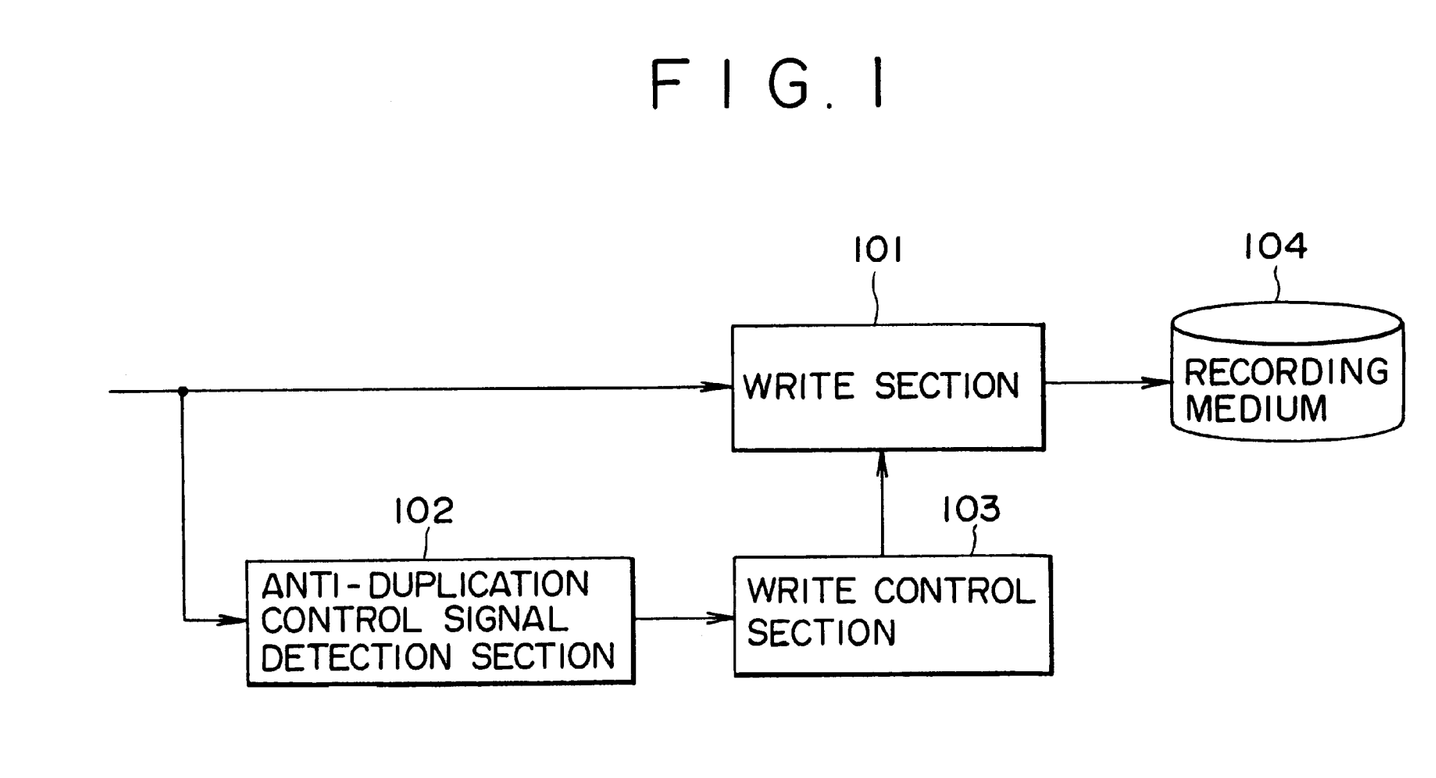
FIG. 1 is a block diagram for illustrating one example of a conventional information signal duplication prevention device.

For example, FIG. 1 shows a basic structure of a recording device which receives a playback video signal obtained by playing back a recording medium on which a video signal having an added anti-duplication control signal is recorded as described hereinabove, and records (duplicates) the video signal in the recording medium 104.

In the case of this recording device, the recording device receives a playback video signal on which an anti-duplication control signal is added, and the playback video signal is supplied to a write section 101 and anti-duplication control signal detection section 102. The anti-duplication control signal detection section 102 detects the anti-duplication control signal added on the playback video signal, and supplies the detection result to a write control section 103 as duplication prevention control information.

The write control section 103 generates a control signal for controlling the write section 101 based on the supplied duplication prevention control information, and supplies it to the write section 101.

The write section 101 converts the playback video signal to information suitable for recording and writes it in a recording medium 104 for performing recording if the control signal from the write control section 103 permits duplication. On the other hand, the write section 101 does not write the playback video signal in the recording medium 104 if the control signal from the write control section 103 inhibits duplication.

Further, if the anti-duplication control signal detected by means of the anti-duplication control signal detection section 102 permits duplication of only first generation, then the write section 101 converts the video signal to information suitable for recording and writes it in the recording medium 104 for performing recording, and also changes the anti-duplication control signal added as additional information to a duplication inhibition signal (duplication inhibition of next generation), and records it in the recording medium 104. As the result, the video signal cannot be duplicated using the duplicated recording medium 104.

As described hereinabove, in the case that an anti-duplication control signal is added on an information signal transmitted to a recording device, the duplication prevention control such as duplication inhibition is performed consistently in a recording medium using such an anti-duplication control signal.

However, in the case of the recording device described using FIG. 1, a significant lag time is required for detection processing of an anti-duplication control signal in the anti-duplication control signal detection section 102 and for generation processing of a write control signal corresponding to anti-duplication control information in the write control section 103. Further, in the case that an anti-duplication signal is partially changed, more time is required.

From the above, some information signals are already recorded during a time period from starting of duplication, followed by detection of an anti-duplication control signal, to ending of execution of duplication prevention control corresponding to the duplication prevention control content which the detected anti-duplication control signal indicates, and as the result, some information signals are recorded and remain in a recording medium though duplication of the information signal is inhibited.

In the case that it takes, for example, several seconds from the time point of the starting of recording processing to the time point when the duplication prevention control corresponding to an anti-duplication control signal added on an information signal becomes active, it is possible to duplicate the entire information signal by way of successive partial duplication of the information signal repeatedly several seconds by several seconds though duplication of the information signal is inhibited.

A method in which a recording device is controlled so that the information signal is not recorded until the duplication prevention control corresponding to an anti-duplication control signal added on the information signal to be duplicated becomes active is considered as a remedy.

However, in this case, the information signal is not recorded in a recording medium until the duplication prevention control content of the anti-duplication control signal added on the information signal is detected to be duplication-permitted though duplication of the information signal is permitted. This method is disadvantageous in that the initial portion of the information signal is not recorded in a recording medium though duplication of the information signal is permitted.

In view of the above-mentioned problems, the object of the present invention is to provide an information signal duplication prevention method and an information signal duplication prevention device which are capable of perfectly preventing illegal duplication of the information signal.

SUMMARY OF THE INVENTION

An information signal recording control device for controlling the recording of an information signal in a recording medium correspondingly to the content of an anti-duplication control signal added on an information signal, wherein the anti-duplication control signal added on the information signal is detected, the recording of the information signal in the recording medium is brought to a stop when the control of the duplication prevention control of the detected anti-duplication control signal is judged to be duplication-inhibited, and at least the information signal recorded by the time the recording of the information signal in the recording medium is brought to a stop is erased from the recording medium.

Further in the present invention, the recording of the information signal is brought to a stop and the recording operation is made impossible thereafter when the content of the duplication prevention control of the anti-duplication control signal is duplication-inhibited.

To solve the above-mentioned problem, the information signal duplication prevention method described regard to an embodiment of the present invention comprises;

a step for detecting an anti-duplication control signal added on an information signal, and a step for stopping duplication of the information signal and for erasing at least the information signal duplicated in a recording medium by the time the duplication of the information signal is brought to a stop when the duplication prevention control content of the anti-duplication control signal is detected to be duplication-inhibited.

The information signal duplication prevention method described regard to an embodiment of the present invention comprises a step for detecting an anti-duplication control signal added on an information signal, and a step for stopping the duplication of the information signal and also for making further duplication operation impossible when the duplication prevention control content of the anti-duplication control signal is detected to be duplication-inhibited.

According to the present invention, duplication of the information signal is brought to a stop and at least the information signal duplicated in a recording medium by the time the duplication of the information signal is brought to a stop is erased when the duplication prevention control content of the anti-duplication control signal added on the information signal to be duplicated is detected to be duplication-inhibited.

In the case that the information signal is partially recorded in a recording medium though the information signal is duplication-inhibited because it takes a certain lag time before the duplication prevention control based on the anti-duplication control signal added on the information signal becomes active, and even though it is an information signal, when it is partially recorded in a recording medium, the information signal recorded on the recording medium is erased. Hence, recording of all the duplication-inhibited information signal by duplicating repeatedly the partial information signals with successive shifting of the portion to be duplicated is prevented. As the result, the duplication of the information signal is prevented consistently and safely correspondingly to the anti-duplication control signal added on the information signal.

DETAILED DESCRIPTION OF THE PREFERRED EMBODIMENTS

One embodiment of the information signal duplication prevention method and information signal duplication-prevention device of the present invention will be described hereinafter with reference to the drawings.

An information signal recording/playback device described hereinafter is structured using the information signal duplication prevention device of the present invention, the case that the information signal duplication prevention device is applied to a DVD (Digital Video Disk) recording/playback device (abbreviated simply as DVD device hereinafter) is described. For purpose of simplification, description of an audio signal system is omitted.

Figure 2:
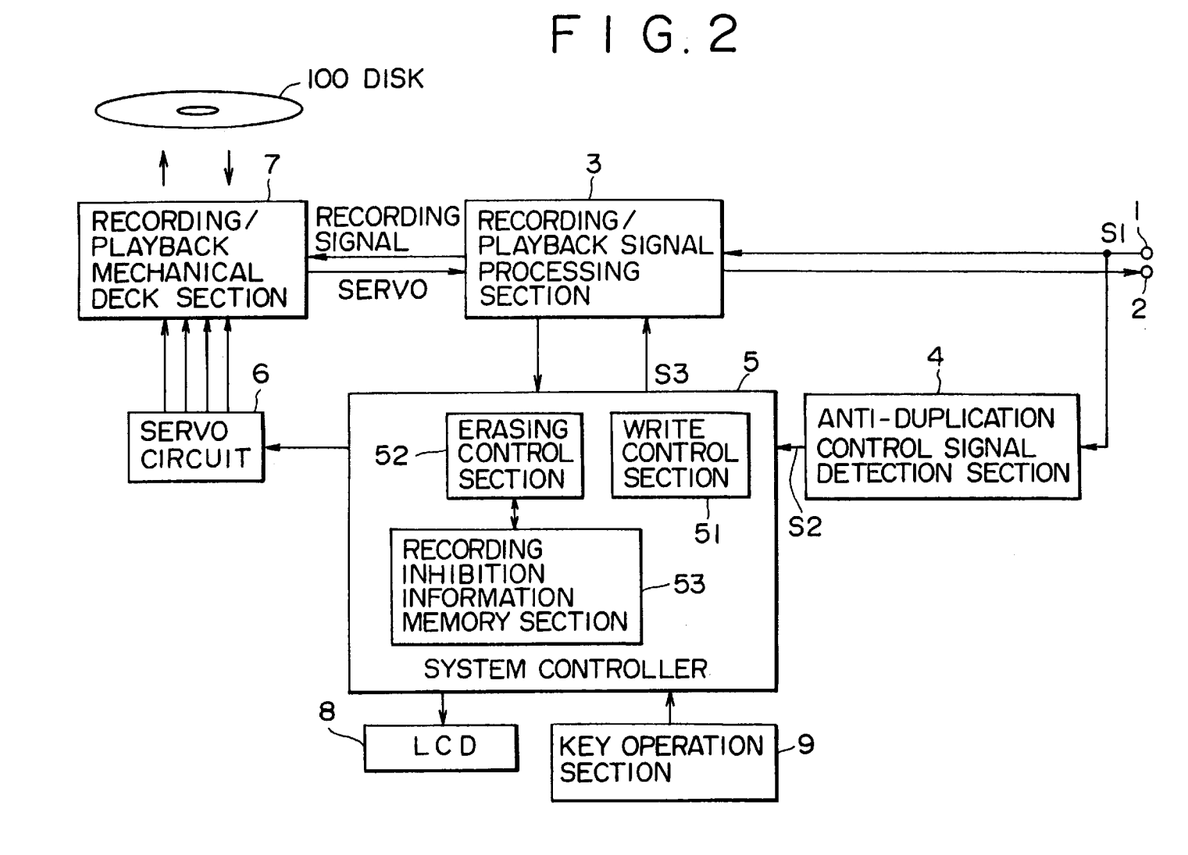
FIG. 2 is a block diagram for illustrating one embodiment of an information signal duplication prevention device in accordance with the present invention.

FIG. 2 is a block diagram for illustrating the DVD device of this embodiment. As shown in FIG. 2, the DVD device of this embodiment is provided with an input terminal 1 for a video signal, an output terminal 2 for a video signal, a recording/playback signal processing section 3, an anti-duplication control signal detection section 4, a system controller 5 for controlling respective sections of this DVD device, a servo circuit 6, a recording/playback mechanical deck section 7 having an optical pickup, a spindle motor, and a moving motor for moving the optical pickup in the radial direction of a disk 100, a liquid crystal display (LCD) 8, and a key operation section 9.

In FIG. 2, digitized video signals, audio signals, and anti-duplication prevention control signals as additional information are recorded in the disk 100, and in this example, the disk 100 is a DVD.

In this embodiment, the anti-duplication control signal is a signal for indicating generation restriction such as duplication permission of the first generation, or duplication inhibition or permission of the video signal, having a one-bit or several-bit structure, added on the video signal.

The DVD device of this embodiment detects the anti-duplication control signal added on the video signal supplied through the input terminal 1, and performs recording control of the video signal correspondingly to the duplication prevention control content of the detected anti-duplication control signal when recording processing as described hereinafter.

Recording processing in the DVD device of this embodiment is described hereinafter.

The video signal S1 on which the anti-duplication control signal is added is input to the DVD device of this embodiment through the input terminal 1. The input video signal S1 is supplied to the recording/playback signal processing section 3 and the anti-duplication control signal detection section 4.

The recording/playback signal processing section 3 is provided with an RF circuit, generates a recording high frequency signal for recording in the disk 100, and supplies it to the recording/playback mechanical deck section 7. The recording/playback signal processing section 3 receives a signal corresponding to the reflected light from the disk 100 supplied from the recording/playback mechanical deck section 7, hence acquires information required for tracking servo and focus servo and address information on the disk 100, and supplies this information to the system controller 5.

The system controller 5 generates a signal for controlling the servo circuit 6 based on the recording start indication information from a user input through the key operation section 9 and the information required for servo control supplied from the recording/playback signal processing section 3 as described hereinabove, and supplies the signal to the servo circuit 6.

The servo circuit 6 generates a spindle servo signal, a tracking servo signal, a light power servo signal, and a focus servo signal, and supplies these signals to the recording/playback mechanical deck section 7.

The supply of these signals activates the recording/playback mechanical deck section 7 to start recording of a recording high frequency signal corresponding to the input video signal S1 in the disk 100.

On the other hand, the anti-duplication control signal detection section 4 detects the anti-duplication control signal added on the video signal S1 supplied to the section, and supplies the detected anti-duplication control signal to the system controller 5 as anti-duplication control information S2.

In this embodiment, the system controller 5 functions as a write control section, erasing control section, and recording inhibition information memory section. Therefore, as shown in FIG. 2, the system controller 5 is described as a system controller having a write control section 51, erasing control section 52, and recording inhibition information memory section 53.

The write control section 51 continues duplication if the anti-duplication control information S2 permits duplication, and on the other hand, generates a write control signal S3 for stopping duplication and supplies it to the recording/playback signal processing section 3 if the anti-duplication control information inhibits duplication.

As the result, the recording/playback signal processing section 3 supplies the recording high frequency signal in the disk 100 if the write control signal S3 indicates duplication continuation, and on the other hand, stops supply of the recording high frequency signal to prevent the recording high frequency signal from being written in the disk 100 if the write control signal S3 indicates duplication inhibition of the video signal S1.

As described hereinabove, the DVD device of this embodiment records the video signal even when the duplication prevention control corresponding to the anti-duplication control signal added on the video signal S1 cannot be executed immediately because, for example, it takes a long time to detect the anti-duplication control signal in the anti-duplication control signal detection section 4.

By operating as described hereinabove, the disadvantage is avoided and the video signal is not recorded until the anti-duplication control signal is detected and the duplication prevention control becomes active though duplication of the video signal is permitted, which will happen in the case that the duplication prevention control is performed so that the video signal is not recorded until the duplication prevention control corresponding to the detected anti-duplication prevention control signal added on the video signal becomes active as described hereinbefore.

Further, the write control section 51 of the system controller 5 of this embodiment generates a duplication control information including information which indicates duplication prevention control content indicated by the anti-duplication control information S2, a duplication start address, a duplication end address, a duplication date, and the type of the signal to be duplicated, and information which indicates duplication control content such as a copyright information of the signal to be duplicated.

Herein, the duplication start address is an address on the disk 100 at the starting time of duplication recording. The starting address indicates the position on the disk 100 where recording of the recording high frequency signal (video signal) acquired from the disk 100 and supplied through the recording/playback signal processing section 3 starts. The duplication end address indicates the position on the disk 100 where duplication recording is brought to a stop. Therefore, the duplication address includes the address where the duplication is brought to a stop forcedly because of duplication inhibition.

The duplication date is, for example, a date acquired from a clock circuit of the system controller 5 when a user inputs recording start indication information. The information which indicates the type of signal to be recorded and the copyright information of the signal to be recorded are signals acquired from the video signal S1.

The duplication prevention control content of the anti-duplication control signal can be uncertain because it takes a long time to detect the anti-duplication control signal added on the video signal S1 as described hereinbefore. In such a condition, the duplication prevention control content of the anti-duplication control signal is regarded as an uncertain condition.

Therefore, in this embodiment, the duplication control information generated by the write control section 51 includes information for indicating duplication permission/uncertain/duplication inhibition of the video signal S1 to be recorded, a duplication start address, a duplication end address, a duplication date, and duplication content. In this embodiment, the duplication control information is used by the erasing control section 52.

Figure 3:
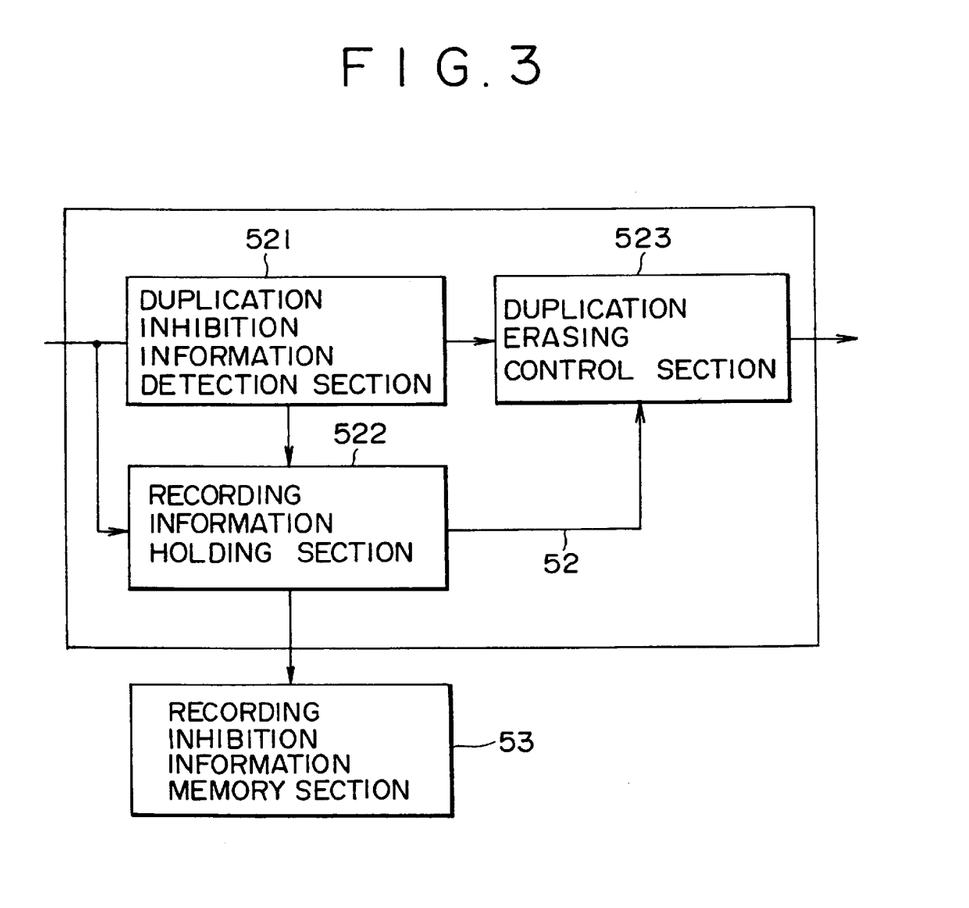
FIG. 3 is a block diagram for illustrating the erasing control section of the information signal duplication prevention device shown in FIG. 2.

FIG. 3 is a block diagram for illustrating the erasing control section 52 of this embodiment. The erasing control section 52 is provided with a duplication inhibition information detection section 521, a recording information holding section 522, and a duplication erasing control section 523 as shown in FIG. 3.

The duplication control information generated by the write control section 51 is supplied to the duplication inhibition information detection section 521 and the recording information holding section 522 of the erasing control section 52.

The duplication inhibition information detection section 521 detects whether duplication of the video signal S1 is inhibited, and supplies the detection result to the duplication erasing control section 523 and the recording information holding section 522.

The recording information holding section 522 is provided with a temporary memory region of information such as a RAM, extracts duplication history information such as the duplication start address and the duplication end address, and duplication-related information such as the duplication date and duplication content (information), and stores them temporarily.

The recording information holding section 522 supplies the duplication start address and the duplication end address which indicates the recording position on the disk 100 of the video signal already recorded in the disk 100 to the duplication erasing control section 523 immediately when the detection result obtained in the duplication inhibition information detection 521 is detected to be duplication-inhibited, and writes the duplication-related information which is stored temporarily in the recording inhibition information memory section 53 to hold the duplication-related information as a duplication history.

The recording inhibition information memory section 53 is structured using, for example, an EEPROM (Electrically Erasable Programmable ROM), the duplication-related information is held after the power source of the DVD device of this embodiment is shut down, and can be erased when the recorded duplication-related information becomes unnecessary.

The duplication erasing control section 523 generates a duplication information erasing control signal for erasing the video signal already recorded in the disk 100 during the recording processing of this time based on the duplication erasing information supplied from the recording information holding section 522 if the detection result obtained in the duplication inhibition information detection section 521 indicates duplication inhibition.

In this embodiment, the video signal recorded in the memory region ranging from the duplication start position indicated by the duplication start address to the duplication end position on the disk 100 in which the video signal is recorded during the recording processing of this time is erased.

Further, for example, in the case that the video signal is recorded on separated regions in the disk 100 as the result of recording selectively on free regions in the disk 100, all the video signals recorded on the separated regions this time are erased.

Thereby, only the video signal which has been recorded in the disk 100 is erased by the time the duplication prevention control content indicated by the anti-duplication control signal is detected to be duplication-inhibited without erasing video signals which was recorded legally prior to this recording processing.

The system controller 5 generates a signal for controlling the servo circuit 6 correspondingly to the duplication information erasing control signal generated by the duplication erasing control section 523, and supplies it to the servo circuit 6. The servo circuit 6 generates various servo control signals as described hereinbefore correspondingly to the signal supplied from the system controller 5, and supplies them to the recording/playback mechanical deck 7.

The respective components of the recording/playback mechanical deck section 7 operate so as to erase the video signal recorded on the region where the video signal is actually recorded by this recording processing.

By operating as described hereinabove, the video signal recorded in the disk 100 by the time the duplication prevention control corresponding to the anti-duplication control signal becomes active though the duplication prevention control content of the anti-duplication control signal added on the video signal indicates duplication inhibition is erased from the disk 100.

Further, when the erasing of the video signal recorded in the disk 100 before the duplication prevention control corresponding to the anti-duplication control signal becomes active is completed, then the duplication-related information written in the recording inhibition information memory section 53 is erased.

However, even in the case that the video signal is recorded in the disk 100 though duplication is inhibited, and the power source of the DVD device of this embodiment is shut down before the video signal duplicated in the disk 100 is erased, the duplication-related information written in the recording inhibition information memory section 53 is not erased.

Hence, because the duplication-related information is stored in the recording inhibition information memory section 53, by erasing the video signal recorded in the disk 100 using the duplication-related information when the power source of the DVD device is supplied again, the video signal, which is originally a duplication-inhibited video signal, recorded in the disk 100 is erased consistently by the time the duplication prevention control corresponding to the anti-duplication control signal becomes active.

The duplication-inhibited video signal does not remain even partially in the disk 100 as described hereinabove, and the duplication prevention control corresponding to the anti-duplication control signal added on the video signal is performed consistently.

Therefore, as described hereinbefore, it is impossible to duplicate all the duplication-inhibited video signal by repeating partial recording with successive shifting of a portion of the video signal to be recorded utilizing the lag time recording that the duplication-inhibited video signal is recorded by the time the duplication prevention control corresponding to the anti-duplication control signal becomes active because it takes a long time to detect the anti-duplication control signal added on the video signal.

In the case that the duplication prevention control corresponding to the anti-duplication control signal added on the video signal is performed and the video signal to be duplicated is a duplication-inhibited video signal, the DVD device of this embodiment displays a message for indicating that the video signal to be duplicated is duplication-inhibited on the LCD 8 after completion of erasing of the video signal recorded in the disk 100 before starting of the duplication prevention control corresponding to the anti-duplication control signal under the control of the system controller 5.

In this case, the DVD device of this embodiment continues to display a message for indicating recording condition until completion of erasing of the video signal recorded on the disk 100 recorded by the time the duplication prevention control corresponding to the anti-duplication control signal becomes active.

By operating as described hereinabove, a user does not recognize that the duplication-inhibited video signal recorded in the disk 100 is erased by the time the duplication prevention control corresponding to the anti-duplication control signal becomes active.

To erase the duplication-inhibited video signal recorded in the disk 100 by the time the duplication prevention control corresponding to the anti-duplication control signal becomes active, the video signal recorded in the disk 100 may be erased physically or may be erased logically by re-writing information of a directory for managing the recording region of the disk 100. Anyway, the important thing is that the information is not read out from the disk 100.

First Modified Example

In the DVD device described using FIGS. 2 and 3, in the case that the detection result in the duplication inhibition information detection section 521 is duplication inhibition, only all the information recorded on the region where the video signal is actually recorded up to this time following the recording start position indicated by the duplication start address and up to the duplication end position on the disk 100 on which the video signal is recorded up to this time is erased. Therefore video signals which were recorded legally in the disk 100 before recording this time remain.

On the other hand, in this first modified example, in the case that the detection result in the duplication inhibition information detection section 521 is duplication inhibition, for example, all the video signals recorded in the disk 100 are erased to penalize a user who intended to duplicate illegally the duplication-inhibited video signal.

In the case that all the video signals recorded in the disk 100 are erased, the duplication-inhibited video signal is erased consistently. Because all the video signals including video signals which were recorded legally before recording this time are erased in this case, a user tends not to duplicate illegally so as to avoid erasing of legally duplicated video signals.

Further in the case that all the video signals recorded in the disk 100 are erased, it is unnecessary for the duplication-related information temporarily stored in the recording information holding section 522 and the duplication-related information written in the recording inhibition information memory section 53 to include the duplication start address and duplication end address.

Second Modified Example

The DVD device described with reference to FIGS. 2 and 3 is a device for duplicating the video signal supplied through the input terminal 1, however the video signal is not limited to a video signal supplied from the same recording medium.

For example, in the case of edit processing in which a plurality of different video signals are compiled, it is considered, for example, that a duplication-permitted video signal and a different duplication-inhibited video signal are supplied alternately to the DVD device shown in FIG. 2 with switching using a switcher to record combined video signals in the disk 100.

In such case, it is possible that the duplication prevention control content of the anti-duplication control signal changes during one recording processing. For example, the duplication prevention control content of the anti-duplication control signal is a mixture of a duplication-permitted condition, an uncertain condition in which the condition is neither duplication-permitted nor duplication inhibited, and a duplication-inhibited condition.

Herein, the uncertain condition is a condition under detection processing of the anti-duplication control signal, or a condition in which it is not clear which of duplication-permission and duplication-inhibition is detected because the duplication prevention control corresponding to the anti-duplication control signal is under detection processing.

In the case that the duplication prevention control content of the anti-duplication control signal changes during one recording processing, it is desirable to perform the duplication prevention control corresponding to the current duplication prevention control. However, because the uncertain condition of the content of the duplication prevention control occurs, it is possible that the video signal cannot be recorded even though it is actually a video signal on which the anti-duplication control signal for indicating duplication permission is added, or that the video signal is recorded even though it is a video signal on which the anti-duplication control signal for indicating inhibition is added.

The duplication-related information including the duplication start address, the duplication end address, the duplication date, the duplication content (information), and the number of times of detection of duplication inhibition generated from the recording inhibition information holding section 522 is held temporarily together with the detection information of the duplication prevention control (referred to as detection information hereinafter) that is information for indicating any of duplication permission/uncertain/duplication inhibition used as information for indicating the duplication prevention control content detected based on the anti-duplication control signal, and the detection information is added also to the duplication-related information to be written in the recording inhibition information holding section 53.

The video signal from which the duplication prevention control detection result of the duplication permission or uncertain condition is recorded in the disk 100.

When the detection of the duplication prevention control content is changed from the uncertain condition to duplication inhibition in the duplication inhibition information detection section 521, the video signal of the portion where the duplication prevention control content is uncertain and the portion where the duplication prevention control content is duplication-inhibited recorded on the disk 100 is erased by the time the duplication prevention content of the anti-duplication control signal is detected to be duplication-inhibited, except for the duplication-permitted portion based on the duplication-related information having the detection information added thereon which indicates the uncertain condition and the duplication-related information having the detection information added thereon which indicates duplication inhibition.

When the duplication prevention content is changed from the uncertain condition to duplication permission in the duplication inhibition information detection section 521, the video signal recorded in the disk 100 is not erased.

Hence, even when the duplication prevention control content of the anti-duplication control signal added on the video signals changed, the duplication prevention control corresponding to the anti-duplication control signal is performed as described hereinbefore.

Third Modified Example

In the DVD device described with reference to FIGS. 2 and 3, the duplication-inhibited video signal is prevented from being illegally duplicated by stopping the recording and erasing the video signal recorded in the disk 100 when the duplication prevention control content of the anti-duplication control signal added on the video signal is detected to be duplication-inhibited.

However, such a duplication prevention control method is not sufficient to sweep off the illegal duplication itself of the video signal by identifying and prosecuting offenders who are involved in illegal duplication of video signals and involved in dealing of such disks manufactured illegally.

To make the duplication prevention control effective, the system controller 5 of the DVD device is made incapable of recording when the duplication prevention control content is detected to be duplication-inhibited in the duplication inhibition information detection section 521.

By structuring as described hereinabove, recording processing cannot be performed using this DVD device thereafter, and the offender who intended illegal duplication is defeated.

In the case of this DVD device, because the device also has a playback function, not only the recording processing is made impossible, but also all the functions of this DVD device including playback processing are made impossible when the duplication prevention control content is detected to be duplication-inhibited.

In the case that the recording processing is made impossible thereafter when the duplication prevention control content is detected to be duplication-inhibited as described hereinabove, because it is impossible to duplicate all the duplication-inhibited video signals by repeating partial duplications of the video signal with shifting successively of the portion to be duplicated, it is an option not to erase the video signal recorded in the disk 100 by the time the duplication is brought to a stop.

Fourth Modified Example

The case that the DVD device is made incapable of performing recording processing thereafter when the duplication prevention control content is detected to be duplication-inhibited as described in the third modified example is, in some cases, too severe for general users.

To mitigate the severity, every time the duplication information holding section 522 is informed of detection of duplication inhibition by the duplication inhibition information detection section 521, and the duplication information holding section 522 adds the number of times of detection of duplication inhibition and acquires and holds the number of times of detection of duplication inhibition of the duplication prevention control content of the anti-duplication control signal.

The number of times of duplication inhibition detection is stored in the duplication information holding section 522 and in the recording inhibition information memory section 53 as a part of the duplication-related information, and every time when a duplication inhibition is detected, whether the number of times of duplication inhibition detection exceeds a pre-determined restriction number is judged.

When the number of times of duplication inhibition detection exceeds the pre-determined restriction number, the system controller 5 judges that the duplication-inhibited video signal is about to be illegally duplicated intentionally using this DVD, and then the DVD device is made incapable thereafter of performing recording processing.

In this case, if a user inputs recording start indication, the system controller 5 does not accept this indication, and the following recording processing is made impossible to be performed.

By structuring as described hereinabove, if the video signal having the added anti-duplication control signal which indicates duplication inhibition is set to be duplicated only once by mistake, only this duplication-inhibited video signal is made impossible to be duplicated, and thereafter recording processing of a duplication-permitted video signal or recording processing of a video signal taken by the user itself using a video camera can be performed normally. Therefore this case is not so severe for users.

A parameter of duplication date of the duplication-related information is involved in addition to the number of times of duplication inhibition detection, recording processing may be made impossible thereafter when the number of times of duplication inhibition detection exceeds a limited number within a pre-determined time period.

As described hereinabove, in the case that the duplication-inhibited video signal is intended to be duplicated repeatedly in the DVD device of this embodiment, the DVD device itself is made incapable of performing recording processing, thereby the action itself to duplicate illegally the duplication-inhibited video signal is prevented.

When the number of times of duplication inhibition detection exceeds a limited number, not only the recording processing, but also the playback processing, namely all the functions of this DVD device, may be made impossible to use.

In the case that the recording processing is made impossible thereafter when the number of times of duplication inhibition detection exceeds the limited number, because it is impossible to duplicate all the duplication-inhibited video signals by repeating partial duplications with successive shifting of the portion to be duplicated like the above-mentioned third modified example, it is an option not to erase the video signal recorded by the time the duplication is brought to a stop.

Fifth Modified Example

In the DVD device described with reference to FIGS. 2 and 3, in the case that the duplication prevention control content is detected to be duplication-inhibited, recording processing is brought to a stop and also the video signal recorded in the disk 100 is erased, the duplication-related information (duplication history) written in the recording inhibition information memory section 53 is erased when erasing of the video signal, which is recorded in the disk 100 by the time the duplication prevention control content is detected to be duplication-inhibited and the recording processing is brought to a stop, is completed normally.

When erasing the video signal, which is recorded in the disk 100 before the duplication prevention control corresponding to the anti-duplication control signal becomes active, is completed normally, the duplication-related information held in the recording information memory section 53 is also erased. Therefore, if the duplication prevention control corresponding to the anti-duplication control signal added on the video signal is performed, the information which indicates the duplication prevention control is erased.

In other words, in the case that recording processing is brought to a stop and the video signal recorded in the disk 100 is erased because the anti-duplication control signal to inhibit duplication was added on the video signal intended to be duplicated, the case cannot be distinguished from the case that the video signal cannot be duplicated due to failure of this DVD.

In such a case, it is required to check the failure of the DVD device or to check whether the anti-duplication control signal for duplication inhibition is added on the video signal which could not be duplicated, and such checking takes extra work and time. Hence, it occurs that complaints from users that the DVD cannot record while it is a DVD device having recording function are not responded to quickly.

To cope with the problem, when erasing of the video signal recorded in the disk 100 is completed as mentioned above by the time the duplication prevention control corresponding to the anti-duplication control signal becomes active, the duplication-related information is not erased from the recording inhibition information memory section 53, but information (referred to as erasing completion information hereinafter) which indicates completion of erasing of the video signal recorded in the disk 100 is added to the duplication-related information, and the added duplication-related information is written in the recording inhibition information memory section 53 to store the duplication-related information in the recording inhibition information memory section 53.

By keeping the duplication-related information in the recording inhibition information memory section 53, when the video signal cannot be duplicated, it is clearly identified whether the trouble is due to duplication control because of the duplication-inhibited video signal or due to failure or mis-operation of the DVD device. By performing as described hereinabove, it is possible to respond quickly, correctly, and easily to users' complaints that the DVD does not function to record the video signal.

Whether erasing of the video signal, which is recorded in the disk 100, is completed by the time the duplication prevention control content of the anti-duplication control signal is detected to be duplication-inhibited and the recording processing is brought to a stop is judged based on the existence of the erasing completion information as described hereinabove.

Hence, as described hereinabove, even if the power source of the DVD device is shut down before or during erasing of the video signal recorded in the disk 100, when the power source is supplied again in the case that there is no erasing completion information in the recording inhibition information memory section 53, the duplication-inhibited video signal is prevented perfectly from being duplicated by performing another processing for erasing the video signal recorded in the disk 100. Thus, it is possible to prevent duplication of all the duplication-inhibited video signals by repeating partial duplication.

The remaining duplication-related information in the recording inhibition information memory section 53 can serve to judge whether this DVD device is a DVD device which has tried to duplicate the video signal illegally. As described hereinabove, the duplication-related information can be used as the information to prosecute offenders who intended to duplicate illegally using this DVD, and is very effective to prevent illegal duplication itself of the video signal.

In the above-mentioned embodiment, the information which is the component of the duplication-related information held in the recording information holding section 522 and recording inhibition information memory section 53 is not limited to the above-mentioned information.

Various information which is obtained and required for the DVD device of the embodiment, for example, information regarding the supplier of the video signal such as the type of the recording medium in which the video signal to be duplicated is recorded or copyright information, may be written in the recording inhibition information memory section 53.

In the above-mentioned embodiment, the DVD device to which the present invention is applied is described, however the present invention is not limited to the DVD device, and the present invention may be applied to recording device and recording/playback device such as a VD (Video Disk), an HD (Hard Disk), an FD (Floppy Disk), and an MD (a small magneto-optical disk called a Mini Disk).

Of course, the present invention can be applied to a VTR (Video Tape Recorder) and a cassette tape recorder. To apply the present invention to a VTR and a cassette tape recorder, a tape counter value at the starting of a recording, a tape counter value at the end of a recording may be used or a time record recorded in a magnetic tape may be used instead of the duplication start address and the duplication end address held as the duplication-related information.

The information signal to be duplicated in a recording medium such as a disk or a magnetic tape is not limited to a video signal, and various information signals such as an audio signal and text data may be used. The present invention is applied in all the cases that these various information signals are duplicated.

The information signal is not limited to a digital signal, and the present invention is also applied to an analog information signal.

The anti-duplication control signal may be a signal which can be added on an information signal such as a video signal and may be supplied together with the information video signal to a recording device for recording the information signal such as a DVD device, and various types of anti-duplication control signals may be used.

For example, an anti-duplication control signal is spectrally spread using a PN (Pseudorandom Noise) series code as a spread code, the spectrally spread anti-duplication control signal is superimposed on an information signal, and the superimposed information signal may be supplied to a recording device for recording.

In this case, the anti-duplication control signal detection section 4 is provided with a PN code generator which generates the same PN code as the one used for the spectral spread and a multiplying circuit, and the original anti-duplication control signal may be extracted by performing spectral inversion spread.

In the above-mentioned embodiment, the case that the video signal to be duplicated on which the anti-duplication control signal is added is supplied through the input terminal 1 in FIG. 2 is described, however a supply source of the information signal, a video signal in this case, may be various playback devices for playing back the information signal or may be reception devices for receiving the transmitted information signal.

In the case of a recording/playback device for performing playback processing and recording processing simultaneously, the present invention is applied to the case that an information signal played back in the playback device section of the recording/playback device is recorded in the recording device section of the recording/playback device.

In the case of such a recording/playback device capable of performing playback processing and recording processing simultaneously, it is not required that an anti-duplication control signal added on an information signal is supplied to the recording device section.

In the case of such a recording/playback device in which the recording medium of an information signal to be played back is, for example, a disk, the present invention is applied to the case that an anti-duplication control signal recorded on TOC (Table Of Contents) of the disk of the playback side read out in the playback device section or on track area called directory is detected, and the duplication prevention control corresponding to the detected anti-duplication control signal is performed.

As described hereinbefore, according to the information signal duplication prevention method and information signal duplication prevention device in accordance with the present invention, the recording processing is controlled correspondingly to the anti-duplication control signal added on the video signal to be duplicated. If the anti-duplication control signal indicates duplication inhibition, the recording processing is brought to a stop, and the information signal recorded in the recording medium is erased by the time the recording processing is brought to a stop. Thereby the duplication of the duplication-inhibited information signal is prevented perfectly from being duplicated.

What is claimed is:

1. An information signal recording control method for controlling recording of an information signal in a recording medium according to a content of an anti-duplication control signal added on said information signal, comprising the steps:
   detecting said anti-duplication control signal added on said information signal and judging said content thereof;
   stopping said recording of said information signal in said recording medium when said content of said detected anti-duplication control signal is judged to be duplication-inhibited;
   erasing from said recording medium said information signal that was recorded between a time when said recording of said information signal is started and a time when said recording of said information signal is stopped because said anti-duplication control signal was judged to be duplication-inhibited; and
   storing a recording region information including a starting point and an ending point of said recording, wherein said recorded information signal is erased based on said recording region information, and said recorded information is one of physically erased and logically erased from said recording medium.

2. The information signal recording method as claimed in claim 1, wherein all information signals that are present in said recording medium are erased when said recording of said information signal in said recording medium is brought to a stop.

3. An information signal recording control device for controlling recording of an information signal in a recording medium according to a content of an anti-duplication control signal added on an information signal, comprising:
   anti-duplication control signal detection means for detecting said anti-duplication control signal added on said information signal and judging said content thereof;
   recording control means for stopping said recording of said information signal in said recording medium when said content of said detected anti-duplication control signal is judged to be duplication-inhibited;
   erasing means for erasing from said recording medium said information signal that was recorded between a time when said recording of said information signal is started and a time when said recording of said information signal is stopped because said anti-duplication control signal was judged to be duplication-inhibited; and
   memory means for storing a recording region information including a starting point and an ending point of said recording in said recording medium where said information signal is recorded, wherein said recorded information signal is erased based on said recording region information, and said recorded information is one of physically erased and logically erased from said recording medium.

4. The information signal recording control device as claimed in claim 3, wherein said erasing means erases all information in said recording medium when said recording of said information signal in said recording medium is brought to a stop.

5. The information signal recording method as claimed in claim 1, wherein the anti-duplication control signal indicates one of duplication permission, an uncertain condition, and a duplication-inhibited condition for controlling duplication of said information signal.

6. The information signal recording method as claimed in claim 5, wherein said information signal is erased in the uncertain condition and in the duplication-inhibited condition when the anti-duplication control signal changes from the uncertain condition to the anti-duplication condition.

7. The information signal recording method as claimed in claim 1, further comprising the step of storing erasing completion information in a memory after said step of erasing from said recording medium is completed.

8. The information signal recording method as claimed in claim 1, wherein said starting point and ending point are stored in a memory separated from said recording medium.

9. The information signal recording method as claimed in claim 1, wherein said starting point and ending point are stored in said recording medium.

10. The information signal recording method as claimed in claim 1 wherein an information signal recorded on said recording medium before a present recording of an information signal is erased when said recording of said information signal in said recording medium is brought to a stop in said step of stopping.

11. The information signal recording control device as claimed in claim 3, wherein the anti-duplication control signal indicates one of duplication permission, an uncertain condition, and a duplication-inhibited condition for controlling duplication of said information signal.

12. The information signal recording control device as claimed in claim 11, wherein said information signal is erased in the uncertain condition and in the duplication-inhibited condition when the anti-duplication control signal changes from the uncertain condition to the anti-duplication condition.

13. The information signal recording control device as claimed in claim 3, further comprising the storage means for storing erasing completion information in a memory after said erasing means completes the erasing from said recording medium.

14. The information signal recording control device as claimed in claim 3, further comprising a memory separated from said recording medium for storing said starting point and ending point.

15. The information signal recording control device as claimed in claim 3, wherein said starting point and ending point are stored in said recording medium.

16. The information signal recording method as claimed in claim 3 wherein an information signal recorded on said recording medium before a present recording process is erased when said recording of said information signal in said recording medium is brought to a stop by said recording control means.

* * * * *